United States Patent [19]

Bizzarri

[11] 4,253,745
[45] Mar. 3, 1981

[54] ANTI-DAZZLE DEVICES

[76] Inventor: Alfredo Bizzarri, Via S. Donato 14/5, Firenze, Italy

[21] Appl. No.: 918,095

[22] Filed: Jun. 22, 1978

[30] Foreign Application Priority Data

Jun. 28, 1977 [IT] Italy ............................... 9501 A/77

[51] Int. Cl.³ ............................................. G02C 7/10
[52] U.S. Cl. ................................................... 351/45
[58] Field of Search ................. 351/44, 45, 47, 49, 351/57, 165, 48, 58; 350/147, 152, 162

[56] References Cited

U.S. PATENT DOCUMENTS

| D. 196,532 | 10/1963 | Facci | D57/1 |
| 2,824,308 | 2/1958 | Duncan | 351/44 |
| 3,705,760 | 12/1972 | Langendorfer et al. | 351/44 |
| 3,901,589 | 8/1975 | Bienenfeld | 351/47 |

FOREIGN PATENT DOCUMENTS

| 213426 | 3/1958 | Australia | 351/45 |
| 1934329 | 1/1971 | Fed. Rep. of Germany | 351/44 |
| 1408195 | 7/1965 | France | 351/47 |
| 1131284 | 10/1968 | United Kingdom | 250/351 |

Primary Examiner—John K. Corbin
Assistant Examiner—B. W. de los Reyes
Attorney, Agent, or Firm—McGlew and Tuttle

[57] ABSTRACT

A device for preventing the eyes from being dazzled by the lights of an oncoming vehicle comprises a spectacle-type frame which carries anti-dazzle lenses having parallel, non-transparent, light-intercepting layers which are inclined forwardly and downwardly. The angular position of the lenses can be adjusted about a horizontal axis to provide the required anti-dazzle effect.

2 Claims, 11 Drawing Figures

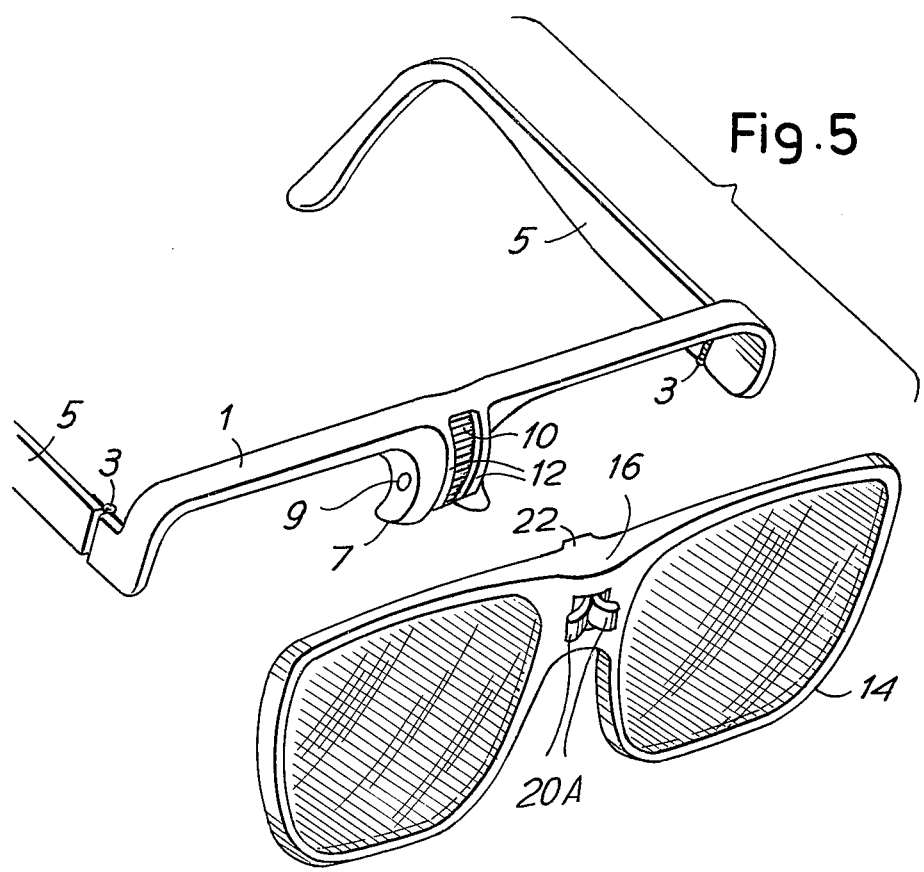
Fig. 5
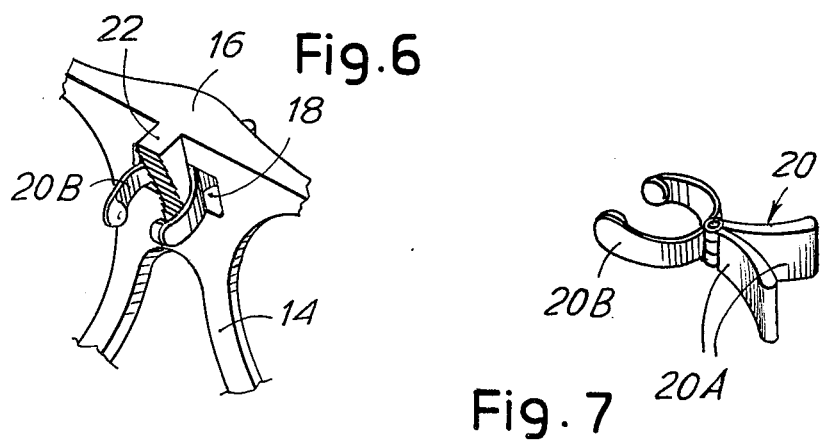
Fig. 6
Fig. 7

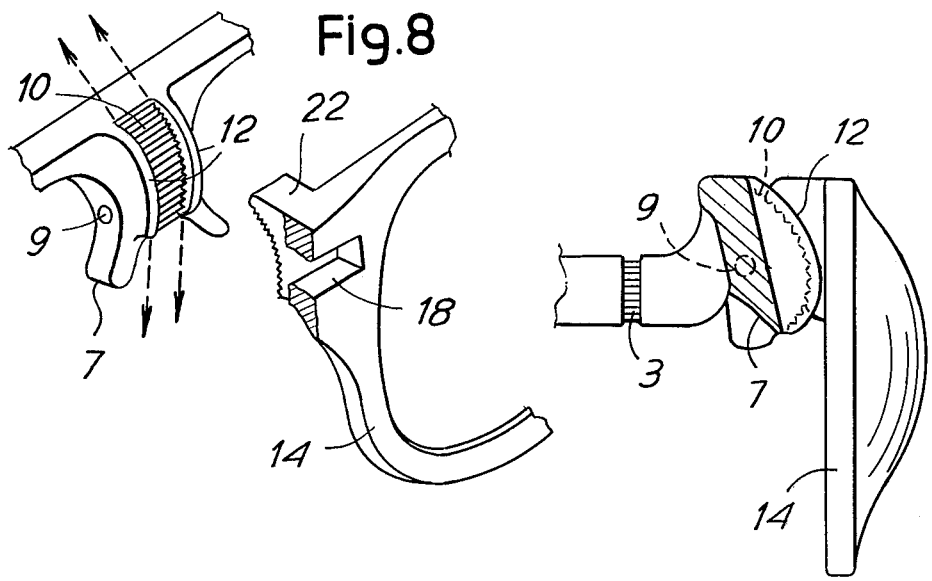
Fig. 8
Fig. 9
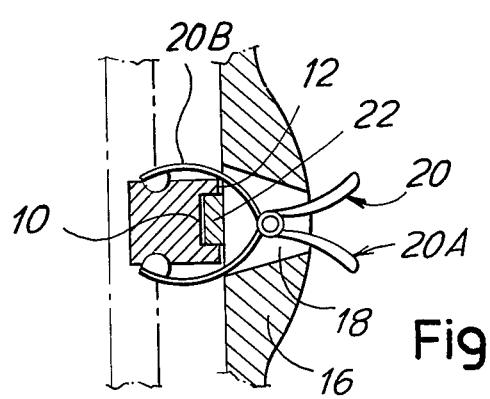
Fig. 10
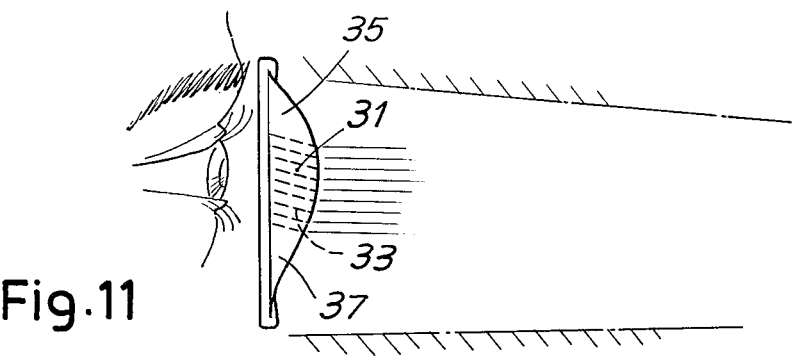
Fig. 11

ANTI-DAZZLE DEVICES

FIELD OF THE INVENTION

The present invention relates to devices for preventing the eyes of a driver or other person from being dazzled by the lights of an oncoming vehicle.

SUMMARY OF THE INVENTION

According to the invention, there is provided a device for preventing the eyes from being dazzled by the lights of an oncoming vehicle, said device comprising support means, anti-dazzle light-transmitting means carried by the support means, means for mounting the support means on the head such that the anti-dazzle light-transmitting means lie directly in front of the eyes, said anti-dazzle light-transmitting means comprising transparent sheets, an array of light-intercepting layers incorporated in the thickness of each sheet, the layers extending forwardly and downwardly, and the spacing between the layers being such that the layers intercept oncoming dazzling beams of light without requiring a substantial change in the position of the head from the normal position.

The light-intercepting layers can be obtained by depositing non-transparent material on adjacent surfaces of adjacent transparent layers of the sheet. Each sheet may be convex towards the outside.

The support means can be carried by a frame which fits on the wear's head in a similar manner to a spectacle frame, the support means being pivotal on the main frame about a substantially horizontal axis to permit adjustment into the required angular position. The support means can be removably attached to the main frame by a resilient clip.

The main frame can also carry a support frame having anti-fog filters or sun-filters to be used as required instead of the support means having the anti-dazzle sheets.

Further according to the invention, there is provided a device for preventing the eyes from being dazzled by the lights of an oncoming vehicle, said device comprises a spectacle-type frame, anti-dazzle lenses carried by the frame, said lenses comprising parallel, non-transparent, light-intercepting layers inclined forwardly and downwardly, and means mounting the lenses for pivotal movement about a substantially horizontal axis to permit the angular position of the lenses to be adjusted in dependence of the normal position of the head to provide the required anti-dazzle effect, the spacing of the layers being such as to cause the layers to intercept oncoming dazzling beams without a substantial change in the position of the head.

Still further according to the invention, there is provided a device for preventing the eyes from being dazzled by the lights of an oncoming vehicle, said device comprising means defining an array of light-intercepting louvres, means mounting the louvres on the head such that the louvres lie in front of the eyes, with the length dimension of the louvres beng substantially horizontal and with the louvres being inclined downwardly from their rear edges to their front edges, and means enabling the array of louvres to be pivoted about a substantially horizontal axis into a selected angular position to be retained in that position.

BRIEF DESCRIPTION OF THE DRAWINGS

An embodiment of the invention will now be described, by way of example only, with reference to the accompanying diagrammatic drawings, in which:

FIG. 5 is an exploded perspective view of the device;

FIGS. 6, 7 and 8 show, in perspective, details of connecting means for connecting a secondary frame to a main mounting frame of the device;

FIGS. 9 and 10 are respectively, a vertical an horizontal section; and

FIG. 11 shows schematically the principle of operation of the device.

DESCRIPTION OF THE PREFERRED EMBODIMENTS

Figure 1:
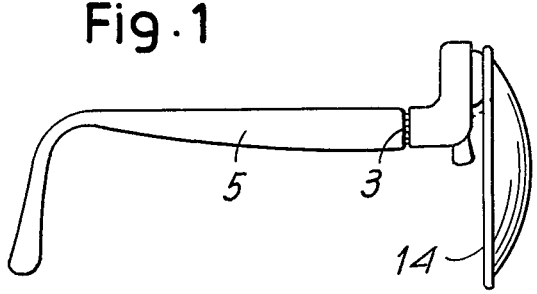
FIGS. 1 and 2 are respectively, an overall side view and an overall perspective view of anti-dazzle devices in accordance with the invention.
Figure 2:
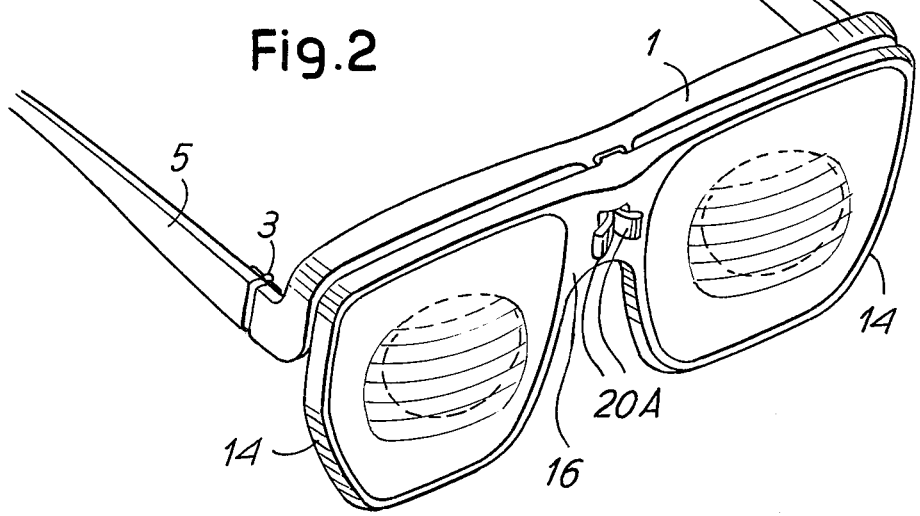

As shown in the drawings, a main mounting frame comprises a cross member 1 having at each end a hinge 3 which supports an earpiece 5 engagable behind the ears of the wearer. In its middle portion the cross member 1 has a downwardly-directed projection 7 which is shaped at its lower end to engage the upper part of the nose, and which has at each side a depression 9 engageable with a hemispherical detent of a clip for securing to the main frame an interchangeable secondary frame. The projection 7 has at the frame an approximately semicircular knurled profile 10 for example with horizontal indentations, the profile 10 being co-axial with a horizontal axis passing through the depressions 9. The profile 10 lies between a pair of substantially parallel edges 12. On the main frame described, lenses of different kinds can be applied, the lenses being carried by corresponding secondary frames.

Each secondary frame has a pair of seats 14 for fitting the lenses and a connecting bridge 16 between the seats 14. The bridge 16 has an aperture 18 which receives a pliers-like resilient clip 20. The clip 20 comprises a pair of operating elements 20A which can be operated from outside and two inner jaw-like elements 20B provided with hemispherical detents arranged to be engaged in the depressions 9. Behind the aperture 18 is located a rearwardly-facing semicircular concave profile 22 corresponding to the profile 10 and having a width equal to the distance between the edges 12 flanking the profile 10. When the secondary frame is to be engaged with the main frame, the jaw-like elements 20B are moved apart by operating the elements 20A to enable the hemispherical detents to engage in the depressions 9, and the profile 22 is presented against the profile 10 and between the two edges 12 which act as vertical guide edges. Under these conditions the secondary frame is engaged on the main frame and its angular position can be adjusted about a horizontal axis passing through the depressions 9. A slight resilient bias is exerted between the interengaging profiles 10, 22 of the main and secondary frames, which permits the profile 22 to be pushed along the profile 10 into a selected angular position and then to be retained in that position by interengagement of the indentations on the two profiles.

Figure 3:
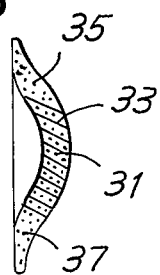
FIGS. 3 and 4 are respectively, a vertical section and a horizontal section of a lens of the device.
Figure 4:
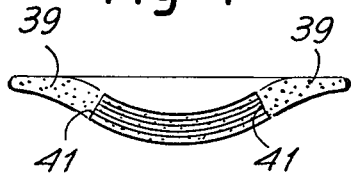

The secondary frame carries anti-dazzle "lenses" in the form of optical sheets shown in detail in FIGS. 3 and 4. As these figures show, the anti-dazzle lens comprises a central transparent portion subdivided into a plurality of parallel oblique layers 31 separated from one another by parallel non-transparent, dull layers 33. The central portion formed in this manner 31 is flanked by a peripheral portion having upper and lower portions 35 and 37 and by side portions 39 which complete the lens assembly. The layers 31 and the non-transparent layers 33 are slightly inclined forwards and downwards, the spacing of the layers 33 (and thus the thickness of the layers 31) being such as to provide adequate vision through the central portion of the lens, while providing the anti-dazzle action as will be discussed later. The lens thus formed will generally have no dioptrical later. The lens thus formed will generally have no dioptrical power so as to avoid optical distortion, unless it is specifically required also to act as a corrective lens for the wearer in question. The pack of layers 31 and layers 33 are advantageously flanked by dull walls 41 formed at opposite sides of the group of layers 31 and sheets 33 so as to lie between this and the side portions 39. In this manner the field of vision of the anti-dazzle lens will be limited by the effect of head rotation to the right or to the left.

The parallel layers 33 form a louvre-type structure, the length dimension of which is horizontal, which divides the central portion of the lens into several layers 31, and this effect can be obtained by depositing non-transparent material between coupled layers of transparent material or by embedding a louvre-type structure in a glass or transparent resin mass.

In use, the secondary frame is placed on the main frame in a suitable angular position depending on the usual head position of the wearer so that the wearer can choose the zone or length of road to be viewed without dazzle. When a vehicle comes in the opposite direction, the wearer need not lower his head to avoid dazzle from the headlights if the secondary frame carrying the anti-dazzle lenses has been located in the correct position; if not, by lowering slightly his head the wearer will shorten, if necessary, the length of the zone free from dazzle and will thereby increase the anti-dazzling effect. However, the road in front of the wearer's vehicle is still adequately visible, albeit in a somewhat restricted manner.

In effect the anti-dazzle lens forms, in front of the eye a thick frame closed at its sides, and containing parallel shutter-like blades inclined slightly forwardly and downwardly, the blades being virtually unnoticeable by the wearer. The blades "cut" the dazzling beam into a number of "slices" and prevent them from reaching the pupil; the blades intercept the beams of dazzling light and direct them on the upper surfaces to pass upwards beyond the wearer's eyebrows.

After the wearer, at the beginning of the journey, has selectively adjusted the angular position of the secondary frame on the main frame according to his normal head position, he can, during the journey also change the anti-dazzling effect, that is the length of the space between the two crossing vehicles which is not subject to dazzle, merely by slightly raising or lowering his head (that is rotating it on the neck) by an amount sufficient to increase or to reduce the inclination of the blades with respect to the dazzling beam.

Secondary frames having sun-lenses or fog-lenses can be mounted on the main frame instead of the secondary frame having the anti-dazzle tension. In practice, the main frame may be sold with a set of three secondary frames, one for the anti-dazzle lenses, one for the sun-lenses, and one for the fog-lenses.

To obtain the separating layers 33 between the layers 31 it is possible to use even a simple flat varnish which may be such as to provide an effective connection between the layers 31.

The inner and outer end edges of the layers 31 can respectively be of flat and cylindrical form to prevent any optical distortion.

Although in the embodiment described, transparent layers are located between the individual light-intercepting layers which form a louvre-type structure, the spaces between adjacent light-intercepting layers may be left vacant.

What is claimed is:

1. A device for preventing the eyes of a user from being dazzled by the lights of an oncoming vehicle, said device comprising: a spectacle-type frame; lens support means carried by the frame; anti-dazzle lenses carried by the support means and having a transparent material and a plurality of substantially horizontal, parallel non-transparent, dull, light-intercepting strips embedded within said transparent material intermediate adjacent layers of said transparent lens material, each of said strips being inclined forwardly and downwardly; interlocking means detachably mounting the support means for selective pivotal movement relative to said frame about a substantially horizontal axis to permit the angular position of said lenses to be adjusted and locked in a plurality of incrementally angularly spaced positions relative to the normal position of the head in direct line with the eyes of the user to provide the required anti-dazzle effect, and the spacing of the strips being such as to cause said strips to intercept oncoming dazzling beams without a substantial change in the position of the head.

2. A device according to claim 1, wherein said interlocking means detachably mounts the support means on the frame and includes cooperatively serrated interlocking members for retaining the support means at a selected angular position on the frame.

* * * * *